(12) United States Patent
Yonetani

(10) Patent No.: US 11,237,300 B2
(45) Date of Patent: Feb. 1, 2022

(54) OPTICAL ELEMENT AND OPTICAL APPARATUS

(71) Applicant: CANON KABUSHIKI KAISHA, Tokyo (JP)

(72) Inventor: Kouichi Yonetani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 16/352,307

(22) Filed: Mar. 13, 2019

(65) Prior Publication Data

US 2019/0285772 A1     Sep. 19, 2019

(30) Foreign Application Priority Data

Mar. 16, 2018 (JP) .............................. JP2018-049735
Jan. 25, 2019 (JP) .............................. JP2019-011397

(51) Int. Cl.
  *G02B 7/02* (2021.01)
  *G02B 1/04* (2006.01)
  *B29D 11/00* (2006.01)

(52) U.S. Cl.
  CPC ........ *G02B 1/041* (2013.01); *B29D 11/00403* (2013.01); *G02B 7/021* (2013.01)

(58) Field of Classification Search
  CPC ... G02B 1/041; G02B 7/021; B29D 11/00403

USPC ......................................................... 359/808
See application file for complete search history.

(56) References Cited

U.S. PATENT DOCUMENTS

| | | | |
|---|---|---|---|
| 2003/0169499 A1* | 9/2003 | Bourdelais | G02B 5/0221 359/599 |
| 2007/0195422 A1* | 8/2007 | Begon | B29C 66/81264 359/642 |
| 2017/0104023 A1* | 4/2017 | Miyake | H01L 27/14698 |

FOREIGN PATENT DOCUMENTS

JP        2010-117472 A     5/2010

\* cited by examiner

*Primary Examiner* — James R Greece
(74) *Attorney, Agent, or Firm* — Canon U.S.A., Inc., IP Division

(57) ABSTRACT

An optical element includes a first resin portion, a second resin portion provided in contact with the first resin portion, an adhesion portion, a first base material, and a second base material, the first resin portion, the second resin portion, and the adhesion portion being provided between the first base material and the second base material. The adhesion portion is in contact with the second resin portion and one of the first base material and the second base material. When an elastic modulus of the first resin portion is denoted by E1, an elastic modulus of the second resin portion is denoted by E2, and an elastic modulus of the adhesion portion is denoted by E3, the optical element satisfies a relationship of E3<E2<0.9× E1.

17 Claims, 7 Drawing Sheets

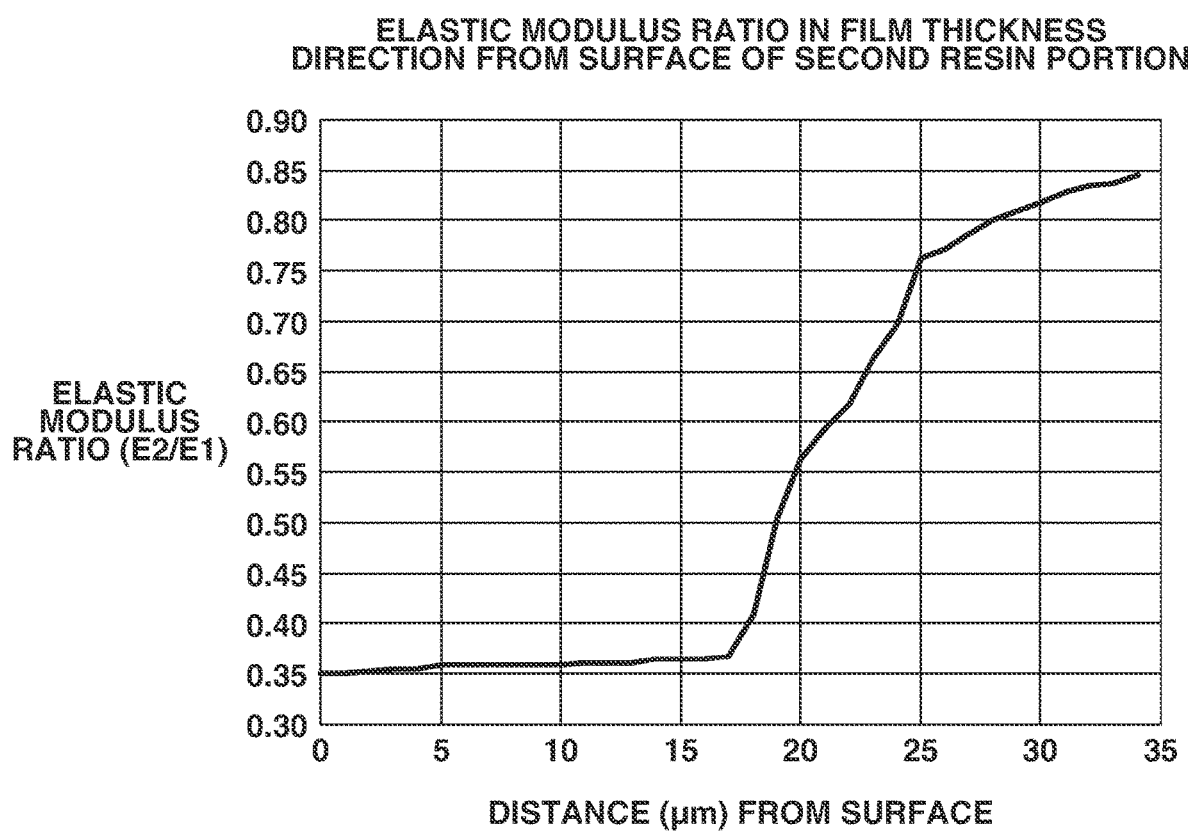

OPTICAL ELEMENT AND OPTICAL APPARATUS

BACKGROUND OF THE INVENTION

Field of the Invention

Aspects of the present disclosure generally relate to an optical element including a resin portion provided between two base materials. Moreover, they relate to an optical apparatus and an imaging apparatus each of which includes the optical element.

Description of the Related Art

In recent years, with the demand for improvement in performance of optical apparatuses, an optical element (lens) constituting an optical system of the optical apparatus has been required to have high performance. Such an optical element often has a structure in which, for example, a resin portion is provided and bonded between two base materials (glass base materials). While functions that are required for optical elements differ depending on optical systems of optical apparatuses, for example, in an optical system which is composed of a plurality of lenses, there is known a lens adapted to correct chromatic aberration caused to occur by a spherical lens.

For example, Japanese Patent Application Laid-Open No. 2010-117472 discusses an optical element including a resin portion and an adhesion portion stacked in layers between two base materials, as a lens adapted to correct chromatic aberration.

The shape of the resin portion of the optical element discussed in Japanese Patent Application Laid-Open No. 2010-117472 is an uneven thickness shape in which the thickness of the central portion thereof is large and the thickness of a portion closer to the end portion thereof is gradually smaller. As the ratio of the thickness of the central portion, which is the largest, to the thickness of the end portion, which is the smallest, (hereinafter referred to as an "uneven thickness ratio"), is larger, the uneven thickness shape enables increasing the effect of chromatic aberration correction.

However, with regard to the optical element discussed in Japanese Patent Application Laid-Open No. 2010-117472, since the materials of respective optical components, including the base material, the resin portion, and the adhesion portion, differ from each other, the linear expansion coefficients and elastic moduli thereof also differ from each other. When there occurs a change in environmental temperature, the degrees of deformation of the respective constituent components differ. Specifically, with regard to each of the resin portion and the adhesion portion, a portion thereof close to an interface thereof with the base material is restrained by the base material, which is small in linear expansion coefficient, and is thus prevented or reduced from being deformed, but a portion thereof distant from the interface thereof with the base material attempts to deform according to the linear expansion coefficient thereof. Therefore, as a result, each of the resin portion and the adhesion portion, which are sandwiched between a first base material and a second base material, has a region large in deformation amount and a region small in deformation amount, so that internal strain (stress) occurs therein. Then, such stress serves as force for attempting to peel the respective constituent components from each other. Here, preventing or reducing peeling between the base material and the resin portion or the adhesion portion by, for example, applying silane coupling treatment to the base material is commonly known. However, there are no countermeasures taken against stress which occurs due to the difference in linear expansion coefficient or elastic modulus between the resin portion and the adhesion portion, and, when there occurs a change in environmental temperature, the optical element discussed in Japanese Patent Application Laid-Open No. 2010-117472 has an issue in that peeling between the resin portion and the adhesion portion is likely to occur starting with the end portion thereof.

SUMMARY OF THE INVENTION

According to an aspect of the present disclosure, an optical element includes a first resin portion, a second resin portion provided in contact with the first resin portion, an adhesion portion, a first base material, and a second base material, the first resin portion, the second resin portion, and the adhesion portion being provided between the first base material and the second base material, wherein the adhesion portion is in contact with the second resin portion and one of the first base material and the second base material, and wherein, when an elastic modulus of the first resin portion is denoted by E1, an elastic modulus of the second resin portion is denoted by E2, and an elastic modulus of the adhesion portion is denoted by E3, the optical element satisfies a relationship of $E3<E2<0.9×E1$.

Further features of the present disclosure will become apparent from the following description of exemplary embodiments with reference to the attached drawings.

BRIEF DESCRIPTION OF THE DRAWINGS

FIG. 7 is a diagram illustrating a measurement result of the elastic modulus of a second resin portion in an optical element in Example 7.

DESCRIPTION OF THE EMBODIMENTS

Optical Element

Figure 1A:
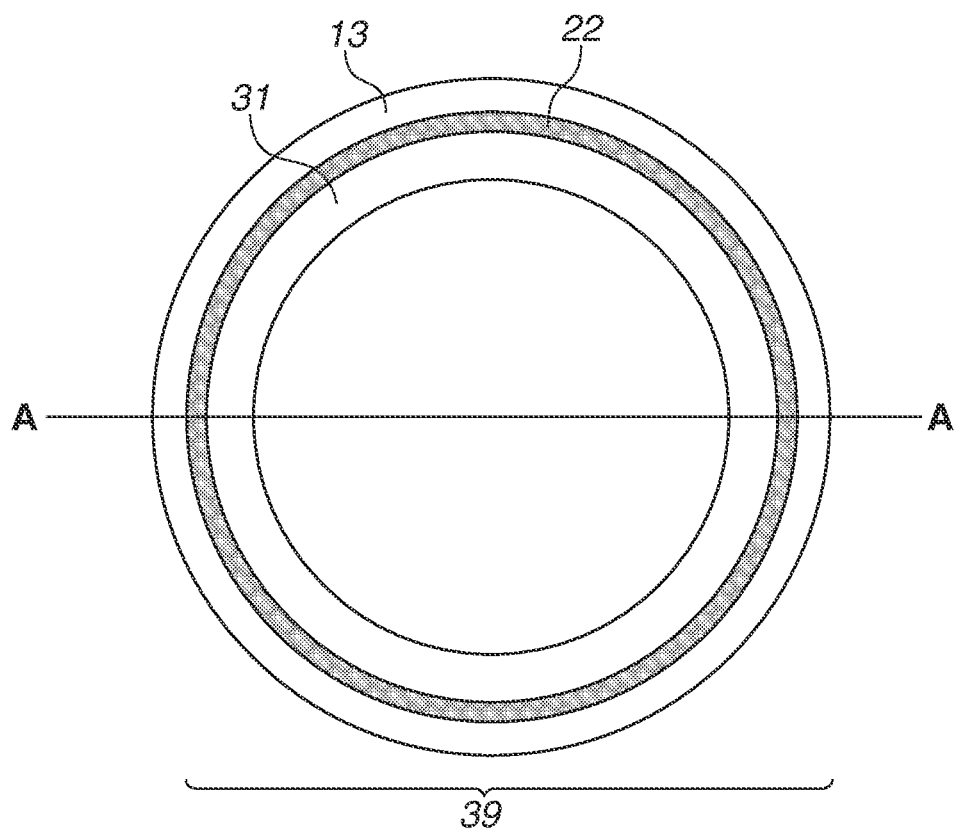
FIGS. 1A and 1B are schematic views illustrating an optical element according to an exemplary embodiment of the present disclosure.
Figure 1B:
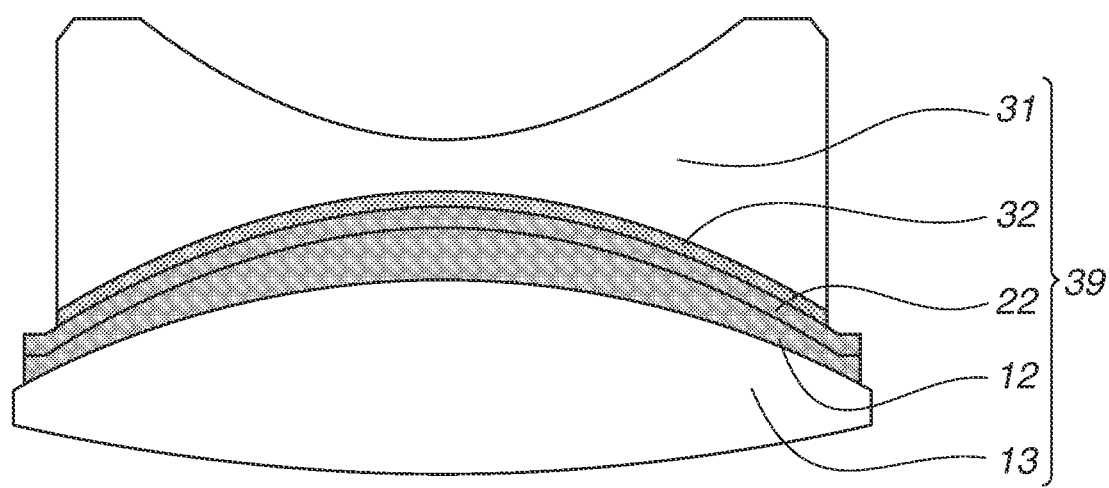

FIGS. 1A and 1B are schematic views illustrating an optical element according to an exemplary embodiment of the present disclosure. FIG. 1A is a top plan view of the optical element as viewed from an optical axis direction thereof, in which a straight line A-A is a line passing through the center of an optical element 39. Moreover, FIG. 1B is a sectional view of the optical element 39 taken along the straight line A-A.

In the optical element 39, a first resin portion 12, a second resin portion 22, and an adhesion portion 32 are provided between a first base material 13 and a second base material 31. Hereinafter, an example in which the first base material 13, which has a convex shape, the first resin portion 12, the second resin portion 22, the adhesion portion 32, and the second base material 31, which has a concave shape, are sequentially stacked in layers is described. Furthermore, an entrance surface for light of the optical element 39 is not specifically limited, and incident light can be received from any one of the side of the first base material 13 and the side of the second base material 31.

A surface of the first base material 13 facing the first resin portion 12 has a convex shape, and the first base material 13 can be made from, for example, glass or plastic having light transmission properties. The curvature of the convex shape can be set depending on the optical performance of the optical element. Primer treatment using, for example, a silane coupling agent can be applied to the surface of the first base material 13 on which the first resin portion 12 is formed, so as to improve adhesiveness.

The first resin portion 12 is provided on the first base material 13.

It is favorable that the first resin portion 12 has an uneven thickness shape in which the thickness of the central portion thereof is large and the thickness of a portion closer to the end portion thereof is gradually smaller. This is because such a shape enables increasing the effect of color aberration correction. Here, the thickness of the first resin portion 12 is a thickness thereof in the direction of a surface normal of the surface of the first base material 13 on which the first resin portion 12 is formed.

Figure 2:
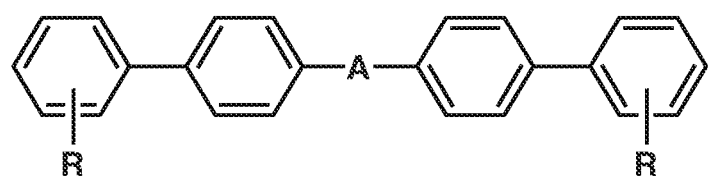
FIG. 2 is a schematic view illustrating a chemical structure of a photocurable resin which is used for a first resin portion and a second resin portion, which constitute the optical element according to the exemplary embodiment.

The resin of the first resin portion 12 is able to be optionally selected depending on a desired optical characteristic, and, for example, a thermosetting resin or a photo-curable resin can be used therefor. Moreover, a resin in which fine particles are dispersed so as to adjust optical characteristics can be used for such a thermosetting resin or photo-curable resin. In terms of a simple manufacturing process being able to be used, it is favorable that a photo-curable resin is used as the first resin portion 12. In terms of a high optical characteristic being able to be obtained, it is favorable that an acrylic resin is used for such a photo-curable resin. A resin having a chemical structure illustrated in FIG. 2 can be used as the acrylic resin. In the chemical structure illustrated in FIG. 2, "A" is selected from among $CH_2$, $C(CH_3)_2$, O, $SO_2$, S, NH, and NX. In a case where "A" is NX, "X" is an alkyl group including a (meth)acrylate group, an aryl, an allyl group, or a carbonyl group, and "R" is a group selected from among an alkyl group including a (meth)acrylate group, an alkoxy group, and an alkylthio group. Furthermore, a single or a plurality of such groups can be used, and, in a case where a plurality of such groups is used, the same groups or different groups can be used. Moreover, a resin obtained by polymerizing or copolymerizing compounds expressed by the following general formula (1) including an acryloyl group or a methacryloyl group can be used.

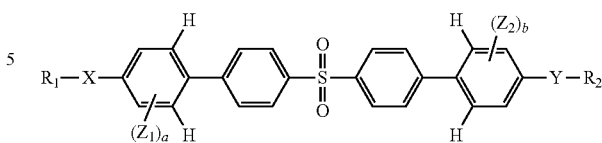

In formula (1), each of "X" and "Y" is any substituent group selected from among the substituent groups shown in the following formula (2).

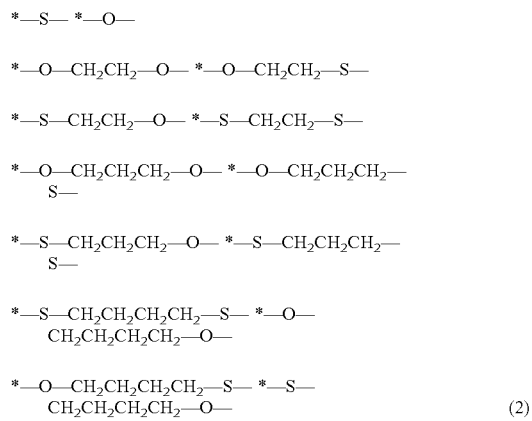

"*" represents a bond with $R_1$ or $R_2$.

Each of $R_1$ and $R_2$ is any substituent group selected from among an alkyl group having hydrogen atoms and with a carbon number of 1 to 2 and a (meth)acryloyl group. Each of $Z_1$ and $Z_2$ is any substituent group selected from among an alkoxy group having hydrogen atoms and halogen atoms and with a carbon number of 1 to 2, an alkylthio group with a carbon number of 1 to 2, an unsubstituted alkyl group with a carbon number of 1 to 2, and a substituent group shown in the following formula (3).

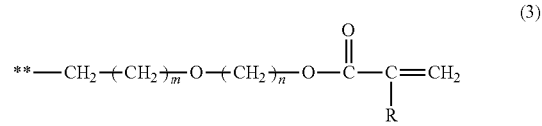

In formula (3), "**" represents a bond, "m" is 0 or 1, "n" is an integer of any one of 2 to 4, "R" is hydrogen or a methyl group.

Each of "a" and "b" is an integer of any one of 0 to 2. When "a" is 2, two groups $Z_1$ can be the same groups or different groups. When "b" is 2, two groups $Z_2$ can be the same groups or different groups.

The second resin portion 22 is provided on the first resin portion 12.

It is favorable that the second resin portion 22 is formed from the same resin as that of the first resin portion 12. This is because employing the same resin facilitates an optical design for an optical element to exert a chromatic aberration correction function. If the second resin portion 22 and the first resin portion 12 are not formed from the same resin, it may become difficult to adjust refractive indices in all of the wavelength bands of the second resin portion 22 and the first resin portion 12.

The elastic modulus E2 of the second resin portion 22 is smaller than the elastic modulus E1 of the first resin portion 12. Specifically, E2/E1 is less than 0.9. Since the elastic modulus of the second resin portion 22, which is in contact with the adhesion portion 32, is smaller than the elastic modulus of the first resin portion 12, which is in contact with the first base material 13, even if a deformation occurs due to a change in environmental temperature, the second resin portion 22 is able to assume the role of decreasing an occurring stress. Since the stress is decreased or reduced, even if a deformation occurs, peeling becomes unlikely to occur between the second resin portion 22 and the adhesion portion 32. On the other hand, if E2/E1 is greater than or equal to 0.9, since the difference between the elastic modulus E1 of the first resin portion 12 and the elastic modulus E2 of the second resin portion 22 is too small, the second resin portion 22 is not able to sufficiently exert the effect of decreasing a stress. Therefore, if a deformation occurs due to a change in environmental temperature, peeling may occur between the second resin portion 22 and adhesion portion 32.

Moreover, it is favorable that the above-mentioned E2/E1 is 0.35 or more and 0.85 or less. E2/E1 being in such a range enables more reducing a stress occurring between the second resin portion 22 and adhesion portion 32 during a deformation. Since the stress is reduced, even if a deformation occurs, peeling becomes unlikely to occur between the second resin portion 22 and the adhesion portion 32. Therefore, the optical element according to the present exemplary embodiment has an excellent chromatic aberration correction function and is unlikely to bring about peeling even if a deformation occurs due to a change in environmental temperature. On the other hand, if E2/E1 is less than 0.35, the chromatic aberration correction function of the optical element may become not sufficient.

Each of the elastic modulus E1 of the first resin portion 12 and the elastic modulus E2 of the second resin portion 22 is larger than the elastic modulus E3 of the adhesion portion 32. Moreover, as mentioned above, the elastic modulus E2 of the second resin portion 22 is smaller than the elastic modulus E1 of the first resin portion 12. Thus, the difference between E2 and E3 is smaller than the difference between E1 and E3. Therefore, if a configuration in which there is no second resin portion 22 lower in elastic modulus than the first resin portion 12 is employed, since the difference between E1 and E3 is large, it is impossible to reduce a stress occurring between the first resin portion 12 and the adhesion portion 32 during a deformation. Therefore, due to the occurring stress, peeling may occur between the first resin portion 12 and the adhesion portion 32.

It is favorable that the thickness of the second resin portion 22 is 15 μm or more and 50 μm or less. Here, the thickness of the second resin portion 22 is a thickness thereof in the direction of a surface normal of the surface of the first resin portion 12 on which the second resin portion 22 is formed. When the thickness of the second resin portion 22 satisfies the above-mentioned range, even if a deformation occurs due to a change in environmental temperature, peeling becomes more unlikely to occur. Here, if the thickness of the second resin portion 22 is smaller than 15 μm, a stress occurring at the second resin portion 22 during a deformation is not able to be sufficiently decreased, so that peeling may occur. On the other hand, if the thickness of the second resin portion 22 is larger than 50 μm, a stress distribution may occur in the thickness direction of the second resin portion 22, so that a cracking may occur.

Here, with regard to the sum of the thickness of the first resin portion 12 and the thickness of the second resin portion 22, it is favorable that the ratio of the thickness at the central portion, which is thickest (maximum thickness tmax) to the thickness at the end portion, which is thinnest (minimum thickness tmin), i.e., the uneven thickness ratio (tmax/tmin), is 14 or more and 50 or less. If the uneven thickness ratio is less than 14, the chromatic aberration correction function of the optical element may not be sufficiently obtained. On the other hand, if the uneven thickness ratio becomes greater than 50, a stress distribution occurs in the thickness direction at portions of the first resin portion 12 and the second resin portion 22 near the central portions in the radial direction thereof, so that a cracking may become likely to occur.

Moreover, it is favorable that the above-mentioned tmax is 0.7 mm or more and 1.4 mm or less. If the above-mentioned tmax is less than 0.7 mm, the chromatic aberration correction function of the optical element may not be sufficiently obtained. On the other hand, if the above-mentioned tmax becomes larger than 1.4 mm, a stress distribution occurs in the thickness direction of the first resin portion 12 or the second resin portion 22, so that a cracking may become likely to occur.

The adhesion portion 32 is provided on the second resin portion 22 and is used to bond the second resin portion 22 and the second base material 31 together.

The adhesion portion 32 is a resin formed from an adhesive. The resin of the adhesion portion 32 is not specifically limited, but can be a thermosetting resin or a photo-curable resin. For example, an acrylic photo-curable resin or an epoxide-based curable resin can be used as the photo-curable resin. It is favorable that, among these resins, an acrylic photo-curable resin is used in terms of not bring about a deformation in a resin portion during a manufacturing process. Moreover, it is favorable that the adhesion portion 32 is low in elastic modulus and soft and has a good property in adherence with the second resin portion 22 and the second base material 31. The thickness of the adhesion portion 32 is not specifically limited, but it is favorable that the thickness of the adhesion portion 32 is 1 μm or more and 30 μm or less. Moreover, it is favorable that the elastic modulus of the adhesion portion 32 is 100 MPa or more and 1 GPa or less.

The second base material 31 can be made from, for example, glass or plastic having light transmission properties. Moreover, the second base material 31 has a concave shape at the surface thereof facing the adhesion portion 32. Moreover, in the present exemplary embodiment, such a concave surface is in contact with the adhesion portion 32. Primer treatment using, for example, a silane coupling agent can be applied to the surface of the second base material 31 which is bonded to the adhesion portion 32, so as to improve adhesiveness. Moreover, the second base material 31 can be made from the same material as that of the first base material 13 or can be made from a material different from that of the first base material 13. While, in the above description, an example in which the first base material 13, which has a convex shape, the first resin portion 12, the second resin portion 22, the adhesion portion 32, and the second base material 31, which has a concave shape, are sequentially stacked in layers has been described, the arrangement of the respective optical components is not limited to this example. A configuration in which the second base material 31, which has a concave shape, the first resin portion 12, the second resin portion 22, the adhesion portion 32, and the first base material 13, which has a convex shape, are sequentially stacked in layers can also be employed.

Method for Manufacturing Optical Element

Next, an example of a method for manufacturing an optical element according to an exemplary embodiment of the present disclosure is described with reference to the drawings. Hereinafter, the description is made with use of a method for manufacturing an optical element in which the first base material 13, which has a convex shape, the first resin portion 12, the second resin portion 22, the adhesion portion 32, and the second base material 31, which has a concave shape, are sequentially stacked in layers. FIGS. 3A, 3B, 3C, 3D, and 3E, FIGS. 4A, 4B, 4C, 4D, and 4E, and FIGS. 5A, 5B, 5C, and 5D are diagrams illustrating a method for manufacturing an optical element according to an exemplary embodiment of the present disclosure. FIGS. 3A to 3E are schematic views illustrating a process for forming the first resin portion 12.

Figure 3A:
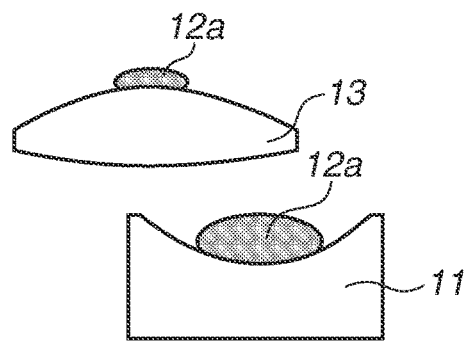
FIGS. 3A, 3B, 3C, 3D, and 3E are schematic views illustrating a process for forming the first resin portion in a method for manufacturing the optical element according to an exemplary embodiment of the present disclosure.

First, as illustrated in FIG. 3A, the method prepares a first base material 13, which has a convex shape at the surface thereof on which to place a resin, and a first mold (metallic mold) 11, which has a concave surface thereof on which to place a resin, and applies a resin 12a to each of the first mold 11 and the first base material 13. Furthermore, the method may apply the resin 12a to any one of the first mold 11 and the first base material 13. The material of the first mold 11 is not specifically limited, but can be, for example, cemented carbide. For example, a photo-curable resin, which is curable by receiving light energy, or a thermosetting resin, which is curable by receiving heat energy, can be used as the resin 12a. Moreover, the method for applying the resin 12a is not specifically limited, but can be the use of, for example, a dispenser. Furthermore, in the following description, an example in which a photo-curable resin is used as the resin 12a is described.

Figure 3B:
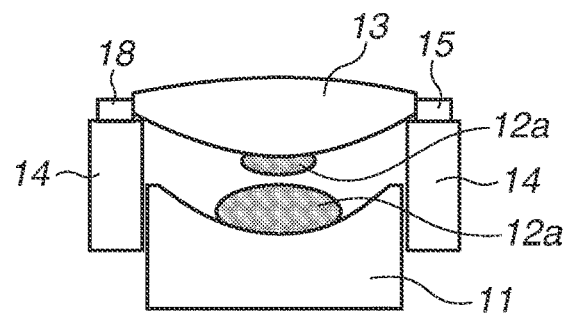

Next, as illustrated in FIG. 3B, the method prepares a first jig including a supporting member 14, a movable portion 15, and a fixed portion 18, and places the first base material 13 to the first jig while causing the surface of the first base material 13 having the resin 12a applied thereto to face the first mold 11. At this time, the method make adjustments using the movable portion 15 in such a manner that the central axis of the first mold 11 and the central axis of the first base material 13 coincide with each other.

Figure 3C:
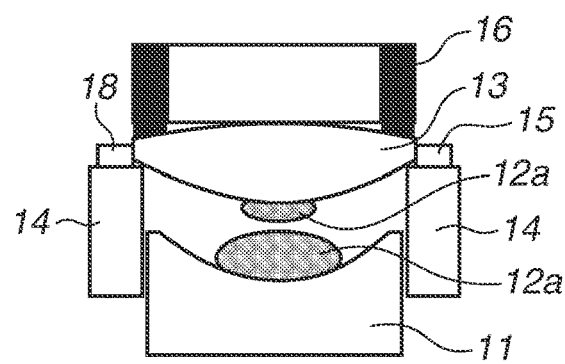

Next, as illustrated in FIG. 3C, the method applies pressure to a pressure member 16 in such a manner that the pressure member 16 comes into contact with the position of the outside of an optical effective portion of the first base material 13. The pressure member 16 is not specifically limited, but, for example, a configuration in which rubber portions are provided at a plurality of places at even distances on concentric circles and such a plurality of rubber portions comes into contact with the first base material 13 can be employed. Moreover, while the pressure to be applied to the pressure member 16 is determined by, for example, the degree of viscosity of a resin to be used or the shape of a base material, as long as the pressure is within the range of 0.01 N/mm$^2$ to 10 N/mm$^2$, issues concerning, for example, filling properties or sucking-in of bubbles do not occur.

Figure 3D:
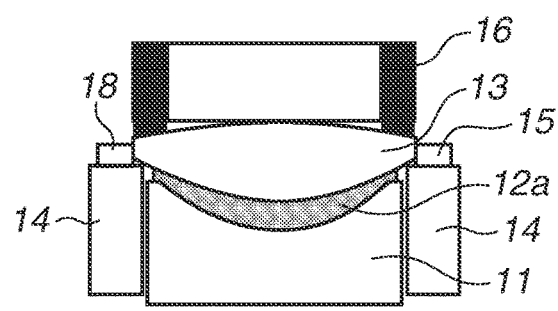

Next, as illustrated in FIG. 3D, the method moves the supporting member 14 to shorten the relative distance between the first mold 11 and the first base material 13, thus filling a space therebetween with the resin 12a in the radial direction of the first base material 13. Moreover, when the resin 12a has reached a desired thickness, the method ends movement of the supporting member 14. After that, the method removes the pressure member 16 from on the first base material 13.

Figure 3E:
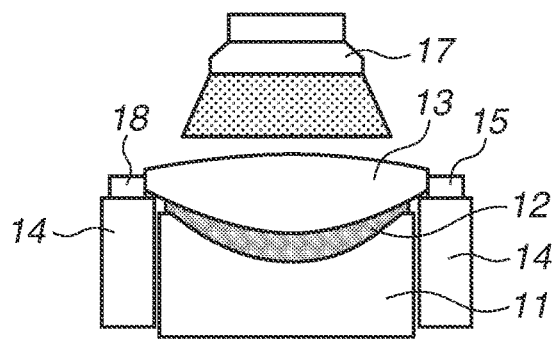

Next, as illustrated in FIG. 3E, the method radiates ultraviolet light from an ultraviolet light source 17 to the resin 12a through the first base material 13, thus forming a first resin portion 12 on the first base material 13. Then, the method releases the first mold 11 from the first resin portion 12. Here, in performing radiation, to prevent impediment to hardening of a photo-curable resin caused by oxygen, it is favorable that the concentration of oxygen is set to 0.01% or less by causing nitrogen gas to flow.

Moreover, to accelerate hardening of the first resin portion 12, it is favorable that, after releasing the first mold 11, the method radiates ultraviolet light while performing heating at a temperature of 50° C. or more. Additionally, in terms of equalizing the hardening reaction rate of the first resin portion 12 in the thickness direction of the first resin portion 12, it is favorable that the above-mentioned heating is vacuum heating, which is performed under vacuum. This is because vacuum heating is able to prevent or reduce impediment to hardening of the first resin portion 12 caused by oxygen in the air. Moreover, it is favorable that the degree of vacuum is 20 Pa or less. Furthermore, it is favorable that the hardening reaction rate of the first resin portion 12 is 40% or more and 80% or less. If the hardening reaction rate of the first resin portion 12 is less than 40%, the property of adherence with the first base material 13 is insufficient, so that peeling may occur in the first resin portion 12. On the other hand, if the hardening reaction rate exceeds 80%, a cracking may occur in the first resin portion 12.

FIGS. 4A to 4E are schematic views illustrating a process for forming the second resin portion 22.

Figure 4A:
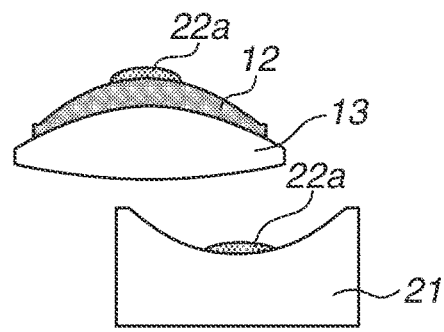
FIGS. 4A, 4B, 4C, 4D, and 4E are schematic views illustrating a process for forming the second resin portion in a method for manufacturing the optical element according to an exemplary embodiment of the present disclosure.

First, as illustrated in FIG. 4A, the method applies a resin 22a to each of a second mold 21, which has a concave shape at the surface thereof at which to place a resin, and the first resin portion 12. Furthermore, the method may apply the resin 22a to any one of the second mold 21 and the first resin portion 12. The material of the second mold 21 is not specifically limited, but can be, for example, cemented carbide. Moreover, the method for applying the resin 22a is not specifically limited, but can be the use of, for example, a dispenser. Here, the resin 22a can be the same resin as the resin 12a.

Figure 4B:
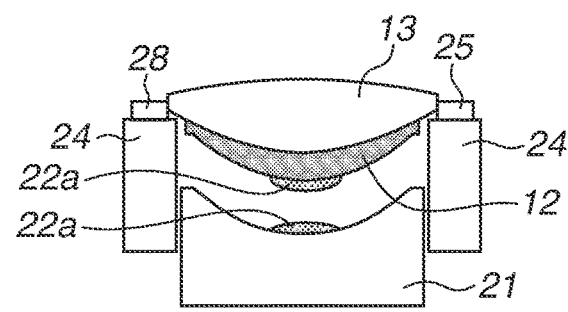

Next, as illustrated in FIG. 4B, the method prepares a second jig including a supporting member 24, a movable portion 25, and a fixed portion 28, and places the first base material 13 to the second jig while causing the surface of the first base material 13 having the first resin portion 12 formed thereon to face the second mold 21. At this time, the method make adjustments using the movable portion 25 in such a manner that the central axis of the second mold 21 and the central axis of the first base material 13 coincide with each other.

Figure 4C:
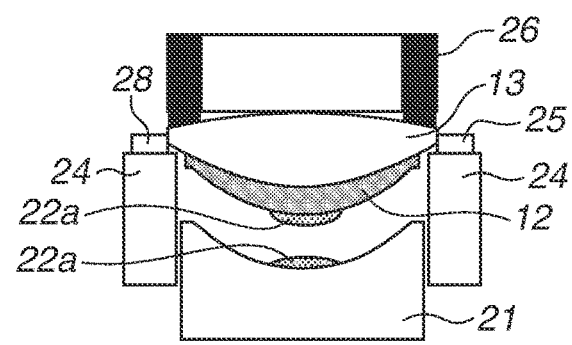

Next, as illustrated in FIG. 4C, the method applies pressure to a pressure member 26 in such a manner that the pressure member 26 comes into contact with the position of the outside of an optical effective portion of the first base material 13. The pressure member 26 is not specifically limited, but, for example, a configuration in which rubber portions are provided at a plurality of places at even distances on concentric circles and such a plurality of rubber portions comes into contact with the first base material 13 can be employed. Moreover, while the pressure to be applied to the pressure member 26 is determined by, for example, the degree of viscosity of a resin to be used or the shape of a base material, as long as the pressure is within the range of 0.01 N/mm$^2$ to 10 N/mm$^2$, issues concerning, for example, filling properties or sucking-in of bubbles do not occur.

Figure 4D:
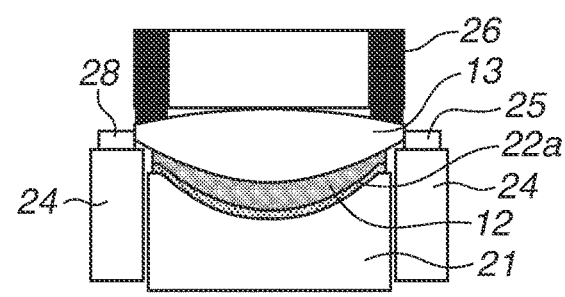

Next, as illustrated in FIG. 4D, the method moves the supporting member 24 to shorten the relative distance between the second mold 21 and the first base material 13, thus filling a space between the second mold 21 and the first resin portion 12 with the resin 22a in the radial direction of the first base material 13. Moreover, when the resin 22*a* has reached a desired thickness, the method ends movement of the supporting member 24. After that, the method removes the pressure member 26 from on the first base material 13.

Figure 4E:
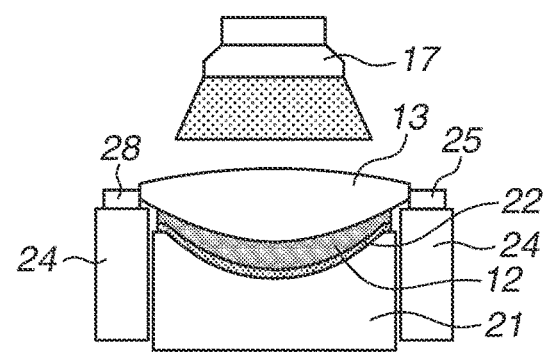

Next, as illustrated in FIG. 4E, the method radiates ultraviolet light from the ultraviolet light source 17 to the resin 22*a* through the first base material 13 and the first resin portion 12, thus forming a second resin portion 22 on the first resin portion 12. Then, the method releases the second mold 21 from the second resin portion 22. Here, in performing radiation, to prevent impediment to hardening of a photo-curable resin caused by oxygen, it is favorable that the concentration of oxygen is set to 0.01% or less by causing nitrogen gas to flow. Here, the method sets the hardening response rate of the second resin portion 22 smaller than that of the first resin portion 12. Setting the hardening response rate of the second resin portion 22 smaller than that of the first resin portion 12 enables making the elastic modulus E2 of the second resin portion 22 smaller than the elastic modulus E1 of the first resin portion 12.

Furthermore, under the condition of setting the hardening response rate of the second resin portion 22 smaller than that of the first resin portion 12, to accelerate hardening of the second resin portion 22, after releasing the second mold 21, the method can radiate ultraviolet light while performing heating. Here, in terms of equalizing the hardening reaction rate of the second resin portion 22 in the thickness direction of the second resin portion 22, it is favorable that the above-mentioned heating is vacuum heating, which is performed under vacuum. This is because vacuum heating is able to prevent or reduce impediment to hardening of the second resin portion 22 caused by oxygen in the air. Here, it is favorable that the degree of vacuum is 100 Pa or less.

FIGS. 5A to 5D are schematic views illustrating a process for bonding the second base material 31.

Figure 5A:
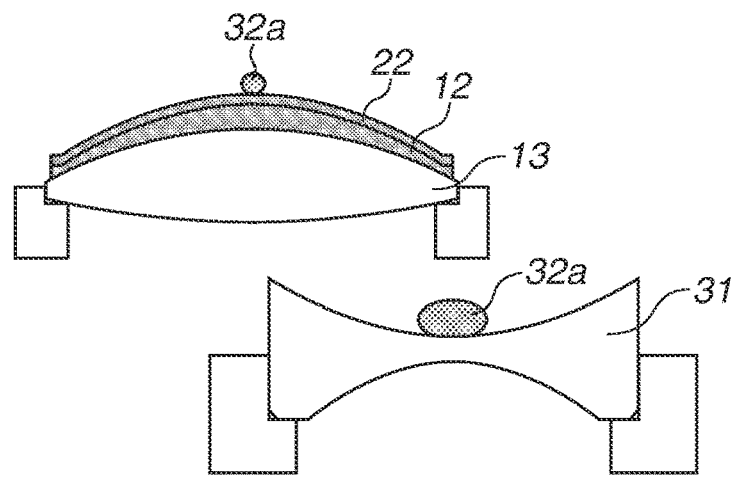
FIGS. 5A, 5B, 5C, and 5D are schematic views illustrating a process for bonding a second base material in a method for manufacturing the optical element according to an exemplary embodiment of the present disclosure.

First, the method prepares a second base material 31, which has a concave shape. Then, as illustrated in FIG. 5A, the method applies an adhesive 32*a* to each of the second resin portion 22 and the second base material 31. Here, a photo-curable resin, which is curable by receiving light energy, or a thermosetting resin, which is curable by receiving heat energy, can be used as the adhesive 32*a*. Moreover, the method for applying the adhesive 32*a* is not specifically limited, but can be the use of, for example, a dispenser. Furthermore, in the following description, an example in which a photo-curable resin is used as the adhesive 32*a* is described.

Figure 5B:
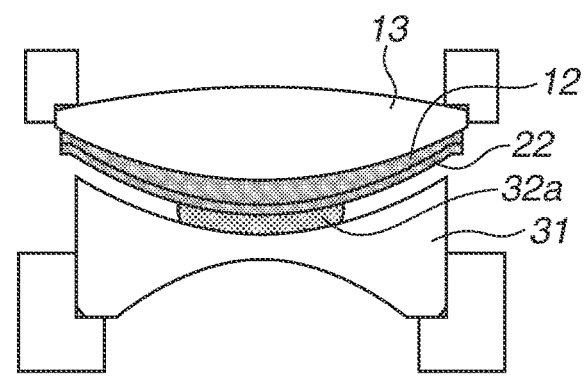

Next, as illustrated in FIG. 5B, the method causes the second base material 31 to face and come close to the adhesive 32*a* applied onto the second resin portion 22.

Figure 5C:
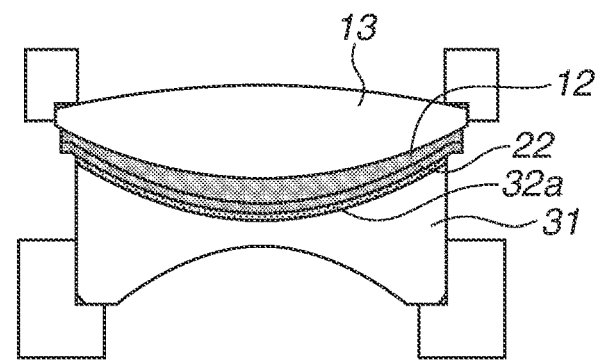

Moreover, as illustrated in FIG. 5C, the method causes the first base material 13 and the second base material 31 to come close to each other in such a manner that the thickness of the adhesive 32*a* becomes a desired thickness, thus filling a space between the second base material 31 and the second resin portion 22 with the adhesive 32*a* in the radial direction of the first base material 13 and the second base material 31.

Figure 5D:
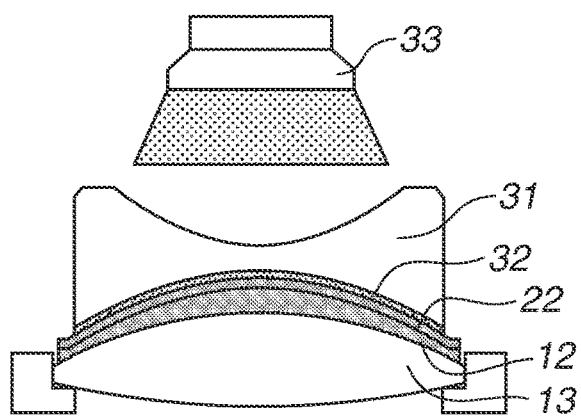

Then, finally, as illustrated in FIG. 5D, the method causes an ultraviolet light source 33 to harden the adhesive 32*a*, thus forming an adhesion portion 32. Thus, the second resin portion 22 and the second base material 31 are bonded to each other via the adhesion portion 32.

With the above-described processes performed, the method is able to manufacture the optical element illustrated in FIGS. 1A and 1B according to the present exemplary embodiment. Furthermore, while the description has been made with use of an example in which the first base material 13, which has a convex shape, the first resin portion 12, the second resin portion 22, the adhesion portion 32, and the second base material 31, which has a concave shape, are sequentially stacked in layers, the arrangement of the respective optical components is not limited to this example. A configuration in which the second base material 31, which has a concave shape, the first resin portion 12, the second resin portion 22, the adhesion portion 32, and the first base material 13, which has a convex shape, are sequentially stacked in layers can also be employed.

Imaging Apparatus

Figure 6:
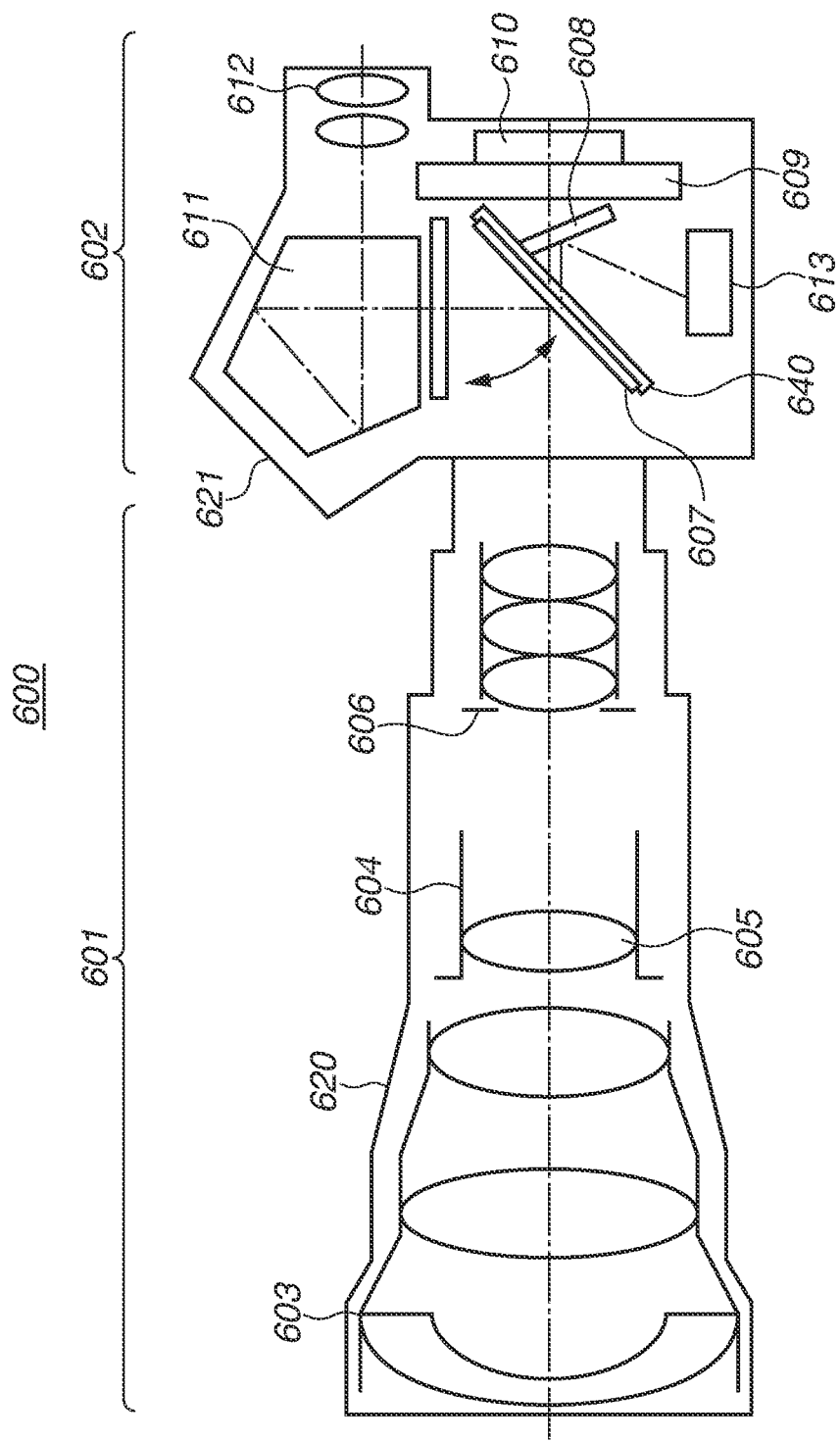
FIG. 6 is a schematic view illustrating an imaging apparatus according to an exemplary embodiment of the present disclosure.

FIG. 6 illustrates a configuration of a single-lens reflex digital camera serving as an example of an imaging apparatus according to an exemplary embodiment of the present disclosure. In FIG. 6, while a camera body 602 and a lens barrel 601, which is an optical apparatus, are coupled to each other, the lens barrel 601 is what is called an interchangeable lens, which is attachable to and detachable from the camera body 602.

Light from a subject is captured as an image via an optical system including, for example, a plurality of lenses 603 and 605 located on the optical axis of an imaging optical system included in a casing 620 of the lens barrel 601. The optical element described in the above-described exemplary embodiment can be used as, for example, each of the lenses 603 and 605.

Here, the lens 605, which is supported by an inner tube 604, is supported in such a way as to be able to rotate relative to an outer tube of the lens barrel 601 for focusing or zooming.

During an observation period prior to image capturing, light from a subject is reflected by a main mirror 607 in a casing 621 of the camera body 602, is allowed to pass through a prism 611, and is then imaged via a viewfinder lens 612 as an image to be captured, which is viewable by the operator. The main mirror 607 is configured as, for example, a half-mirror, so that light passing through the main mirror 607 is reflected by a sub-mirror 608 toward an autofocus (AF) unit 613, and, for example, the reflected light is used for distance measurement (focusing). Moreover, the main mirror 607 is mounted on and supported by a main mirror holder 640 with, for example, adhesive bonding. During image capturing, the main mirror 607 and the sub-mirror 608 are moved by a drive mechanism (not illustrated) to outside the optical path, a shutter 609 is opened, and an image of light entering from the lens barrel 601 is focused on an image sensor 610. Moreover, a diaphragm 606 is configured to change the brightness or depth of focus during image capturing by changing the aperture area.

EXAMPLES

Next, examples are set forth to specifically describe an optical element and a method for manufacturing the optical element according to the above-described exemplary embodiment, but the present invention is not intended to be limited by the following examples.

First, the optical element according to the above-described exemplary embodiment was evaluated with use of the following method. The evaluation method is described as follows.

Method for Measuring Hardening Response Rate

The hardening response rates of the first resin portion and the second resin portion were measured with use of a Fourier transform infrared spectroscopy analysis device (FTIR, manufactured by PerkinElmer, Inc., product name: Spectrum One). Specifically, the peak areas related to double bonds of carbons of absorbance spectra of a resin obtained by the FTIR were obtained, and the hardening response rates were calculated with use of the following formula.

$$\left(1 - \frac{S1/S2}{S3/S4}\right) \times 100$$

S1: the peak area related to a double bond in a cured state;
S2: the peak area not related to a double bond in a cured state;
S3: the peak area related to a double bond in an uncured state; and
S4: the peak area not related to a double bond in an uncured state.

Method for Measuring Elastic Modulus

The elastic moduli of the first resin portion, the second resin portion, and the adhesion portion were evaluated with use of a Nanoindenter (manufactured by Keysight Technologies, Inc., product name: Nanoindenter G200) at a temperature of 23° C.±2° C. Furthermore, while the first resin portion and the second resin portion were made from the same material, the boundary therebetween was confirmable with, for example, a microscope.

Evaluation for Peeling after High-temperature Endurance Test

The optical element was put in a constant-temperature bath, which was set at 60° C., for 2 hours and was then taken out from the constant-temperature bath. After that, the presence or absence of peeling of the resin portion and the adhesion portion at the end portion of the optical element was observed at room temperature (23° C.±2° C.) with an optical microscope. The optical element in which peeling had been confirmed was evaluated as "C", and the optical element in which no peeling had been confirmed was evaluated as "A".

Optical Characteristic

A camera including an optical system in which the optical element was incorporated was produced, and a plate having a striped pattern formed with three colors of red, green, and blue (RGB) was photographed for every color. The taken photographs and the plate (real thing) were compared with each other, the value of resolution for every color was measured by image processing software, and an optical element in which the chromatic aberration deviation exceeded a reference value in at least one color was evaluated as "C" in optical characteristic. Moreover, an optical element in which the chromatic aberration deviation is the same as the reference value was evaluated as "B", and an optical element in which the chromatic aberration deviation is less than the reference value was evaluated as "A".

Example 1

The optical element illustrated in FIGS. 1A and 1B was prepared by the processes illustrated in FIGS. 3A to 3E through FIGS. 5A to 5D. The first base material 13 was made from a glass material (manufactured by Ohara, Inc., product name: S-FPM2) processed into a spherical shape and with a diameter of 41 mm. The first mold 11 was made from a cemented carbide (manufactured by Fuji Die Co., Ltd., product name: F10) subjected to mirror-like finishing and had a shape obtained by inverting the shape of the first resin portion 12. Here, with regard to the shape of the first resin portion 12, the maximum thickness at the center of the first resin portion 12 was set to 0.985 mm, the minimum thickness at the end portion thereof was set to 35 μm, and the distance from the center to the end portion was set to 18.75 mm. The resin 12a was made from an acrylic ultraviolet curable resin.

First, the resin 12a was applied to the first base material 13 and the first mold 11 (FIG. 3A) with use of a dispenser (manufactured by Musashi Engineering, Inc., product name: SMP-3). Next, a first jig including the supporting member 14, the movable portion 15, and the fixed portion 18 was prepared, and the first base material 13 was placed on the first jig with the surface of the first base material 13 to which the first resin 12a was applied facing the first mold 11. At that time, adjustments using the movable portion 15 was made in such a manner that the distance between the central axis of the first mold 11 and the central axis of the first base material 13 became 20 μm or less (FIG. 3B). Next, pressure at 200 N was applied to the pressure member 16 in such a manner that the pressure member 16 came into contact with the position having a distance of 18.95 mm from the center, which was the position of the outside of an optical effective portion of the first base material 13 (FIG. 3C). Additionally, the supporting member 14 was moved to shorten the relative distance between the first mold 11 and the first base material 13, so that a space between the first mold 11 and the first base material 13 was filled with the resin 12a in the radial direction of the first base material 13. Moreover, when the thickness of the resin 12a at the end portion thereof had reached 35 μm, the movement of the supporting member 14 was ended. After that, the pressure member 16 was removed from on the first base material 13 (FIG. 3D). Next, ultraviolet light was radiated from the ultraviolet light source 17 to the resin 12a through the first base material 13, so that the first resin portion 12 was formed on the first base material 13 (FIG. 3E). Here, the amount of radiation of ultraviolet light was 10 J. Then, the first mold 11 was released from the first resin portion 12. Furthermore, radiation was performed in a state in which the concentration of oxygen was set to 0.01% or less by causing nitrogen gas to flow. The hardening reaction rate of the first resin portion 12 obtained at that time was 40%.

Moreover, to accelerate hardening of the first resin portion 12 after releasing the first mold 11, ultraviolet light was radiated while vacuum heating was performed under the conditions of the degree of vacuum of 10 Pa and a temperature of 70° C. Here, the amount of radiation of ultraviolet light was 10 J. The hardening reaction rate of the first resin portion 12 obtained after vacuum heating was performed was 70%.

Next, the second resin portion 22 with a thickness of 15 μm was formed on the first resin portion 12. The second mold 21 was made from a cemented carbide (manufactured by Fuji Die Co., Ltd., product name: F10) subjected to mirror-like finishing and had a shape obtained by inverting the shapes of the first resin portion 12 and the second resin portion 22. Here, with regard to the shape of the second resin portion 22, the thickness was set to 15 μm, and the distance from the center to the end portion was set to 18.75 mm.

Next, a resin 22a was applied to the second mold 21, which had a shape obtained by inverting the shapes of the first resin portion 12 and the second resin portion 22, and the first resin portion 12 with use of the dispenser (FIG. 4A). Next, a second jig including a supporting member 24, a movable portion 25, and a fixed portion 28 was prepared, and the first base material 13 was placed to the second jig while the first resin portion 12 formed on the first base material 13 was caused to face the second mold 21 (FIG. 4B). At that time, adjustments using the movable portion 25 were made in such a manner that the distance between the central axis of the second mold 21 and the central axis of the first base material 13 became 20 µm or less. Next, pressure was applied to a pressure member 26 at 200 N in such a manner that the pressure member 26 came into contact with the position of the outside of an optical effective portion of the first base material 13 (FIG. 4C). Next, the supporting member 24 was moved to shorten the relative distance between the second mold 21 and the first base material 13, so that a space between the second mold 21 and the first resin portion 12 was filled with the resin 22a in the radial direction of the first base material 13. Moreover, when the thickness of the resin 22a had reached 15 µm, the movement of the supporting member 24 was ended. After that, the pressure member 26 was removed from on the first base material 13 (FIG. 4D). Next, ultraviolet light was radiated from the ultraviolet light source 17 to the resin 22a through the first base material 13 and the first resin portion 12, so that a second resin portion 22 was formed on the first resin portion 12 (FIG. 4E). Here, the amount of radiation of ultraviolet light was 10 J. Then, the second mold 21 was released from the second resin portion 22. Here, radiation was performed in a state in which the concentration of oxygen was set to 0.01% or less by causing nitrogen gas to flow. The hardening reaction rate of the first resin portion 12 obtained at that time was 40%. Thus, the hardening reaction rate of the second resin portion 22 was lower than that of the first resin portion 12.

Next, the second base material 31 was prepared, and a photo-curable adhesive 32a (manufactured by Kyoritsu Chemical & Co., Ltd., product name: WR 8807LK) is applied to each of the second resin portion 22 and the second base material 31 (FIG. 5A). Next, the second base material 31 was caused to face and come close to the adhesive 32a applied onto the second resin portion 22 (FIG. 5B). Additionally, the first base material 13 and the second base material 31 were caused to come close to each other in such a manner that the thickness of the adhesive 32a became 15 µm, so that a space between the second base material 31 and the second resin portion 22 was filled with the adhesive 32a (FIG. 5C). Then, an ultraviolet light source 33 was caused to harden the adhesive 32a, so that the second resin portion 22 and the second base material 31 were bonded to each other via an adhesion portion 32 (FIG. 5D). With the above-described processes, the optical element of Example 1 was produced.

The manufacturing conditions of the optical element were summarized in Table 1.

Furthermore, with regard to the sum of the thickness of the first resin portion and the thickness of the second resin portion of the obtained optical element, the maximum thickness at the center was 1.0 mm, the minimum thickness at the end portion was 50 µm, and the uneven thickness ratio was 20.

TABLE 1

| | | Example 1 | Example 2 | Example 3 |
|---|---|---|---|---|
| Anterior process for first resin portion | Amount of radiation of ultraviolet (J) | 10 | 10 | 10 |
| | Atmosphere | nitrogen | nitrogen | nitrogen |
| | Hardening response rate (%) | 40 | 40 | 40 |
| Posterior process for first resin portion | Amount of radiation of ultraviolet (J) | 10 | 10 | 10 |
| | Degree of vacuum (Pa) | 10 | 10 | 10 |
| | Temperature (° C.) | 70 | 70 | 70 |
| | Hardening response rate (%) | 70 | 70 | 70 |
| Anterior process for second resin portion | Amount of radiation of ultraviolet (J) | 10 | 10 | 10 |
| | Atmosphere | nitrogen | nitrogen | nitrogen |
| | Hardening response rate (%) | 40 | 40 | 40 |
| Posterior process for second resin portion | Amount of radiation of ultraviolet (J) | unperformed | 10 | unperformed |
| | Degree of vacuum (Pa) | | 10 | |
| | Temperature (° C.) | | 75 | |
| | Hardening response rate (%) | | 60 | |

| | | Example 4 | Example 5 | Example 6 |
|---|---|---|---|---|
| Anterior process for first resin portion | Amount of radiation of ultraviolet (J) | 10 | 10 | 10 |
| | Atmosphere | nitrogen | nitrogen | nitrogen |
| | Hardening response rate (%) | 40 | 40 | 40 |
| Posterior process for first resin portion | Amount of radiation of ultraviolet (J) | 10 | 10 | 10 |
| | Degree of vacuum (Pa) | 10 | 10 | 10 |
| | Temperature (° C.) | 70 | 70 | 70 |
| | Hardening response rate (%) | 70 | 70 | 70 |
| Anterior process for second resin portion | Amount of radiation of ultraviolet (J) | 10 | 10 | 10 |
| | Atmosphere | nitrogen | nitrogen | nitrogen |
| | Hardening response rate (%) | 40 | 40 | 40 |

TABLE 1-continued

|  |  |  |  |  |
|---|---|---|---|---|
| Posterior process for second resin portion | Amount of radiation of ultraviolet (J) | 10 | 10 | unperformed |
|  | Degree of vacuum (Pa) | 10 | 10 |  |
|  | Temperature (° C.) | 75 | 75 |  |
|  | Hardening response rate (%) | 60 | 60 |  |

|  |  | Example 7 | Comparative Example 1 | Comparative Example 2 |
|---|---|---|---|---|
| Anterior process for first resin portion | Amount of radiation of ultraviolet (J) | 10 | 10 | 10 |
|  | Atmosphere | nitrogen | nitrogen | nitrogen |
|  | Hardening response rate (%) | 40 | 40 | 40 |
| Posterior process for first resin portion | Amount of radiation of ultraviolet (J) | 10 | 10 | 10 |
|  | Degree of vacuum (Pa) | Air | 10 | 10 |
|  | Temperature (° C.) | 90 | 70 | 70 |
|  | Hardening response rate (%) | 60 | 70 | 70 |
| Anterior process for second resin portion | Amount of radiation of ultraviolet (J) | unperformed | unperformed | 10 |
|  | Atmosphere |  |  | nitrogen |
|  | Hardening response rate (%) |  |  | 40 |
| Posterior process for second resin portion | Amount of radiation of ultraviolet (J) | unperformed | unperformed | 10 |
|  | Degree of vacuum (Pa) |  |  | 10 |
|  | Temperature (° C.) |  |  | 82 |
|  | Hardening response rate (%) |  |  | 65 |

Subsequently, the evaluation of the optical element of Example 1 was conducted.

In the optical element of Example 1, after a high-temperature endurance test, peeling was not found.

Moreover, the elastic modulus E1 of the first resin portion was 3.5 GPa, and the elastic modulus E2 of the second resin portion was 1.23 GPa, so that E2/E1 was 0.35. Moreover, the elastic modulus of the adhesion portion was 174 MPa.

Moreover, a camera including an optical system in which the optical element was incorporated was produced, and a plate having a striped pattern formed with three colors of red, green, and blue (RGB) was photographed for every color, so that, when chromatic aberration was evaluated, the evaluation result was "A".

The evaluation results of the optical element were summarized in Table 2.

TABLE 2

|  |  | Unit | Example 1 | Example 2 | Example 3 | Example 4 |
|---|---|---|---|---|---|---|
| First resin portion | Maximum film thickness | mm | 0.985 | 0.985 | 0.95 | 0.685 |
|  | Minimum film thickness | μm | 35 | 35 | 0 | 35 |
|  | Elastic modulus E1 | GPa | 3.5 | 3.5 | 3.5 | 3.5 |
| Second resin portion | Film thickness t | μm | 15 | 15 | 50 | 15 |
|  | Elastic modulus E2 | GPa | 1.23 | 2.98 | 1.23 | 2.98 |
| Sum of first resin portion and second resin portion | Maximum film thickness | mm | 1.0 | 1.0 | 1.0 | 0.7 |
|  | Minimum film thickness | μm | 50 | 50 | 50 | 50 |
|  | Uneven thickness ratio (maximum film thickness/ minimum film thickness) | none | 20 | 20 | 20 | 14 |
| Elastic modulus ratio (E2/E1) |  | none | 0.35 | 0.85 | 0.35 | 0.85 |
| Evaluation of peeling |  | none | A | A | A | A |
| Optical characteristic |  | none | A | A | A | A |

|  |  | Unit | Example 5 | Example 6 | Example 7 |
|---|---|---|---|---|---|
| First resin portion | Maximum film thickness | mm | 1.385 | 0.94 | 0.966 |
|  | Minimum film thickness | μm | 13 | 0 | 16 |
|  | Elastic modulus E1 | GPa | 3.5 | 3.5 | 3.5 |
| Second resin portion | Film thickness t | μm | 15 | 60 | 34 |
|  | Elastic modulus E2 | GPa | 2.98 | 1.23 | 1.23-2.98 |
| Sum of first resin portion and second resin portion | Maximum film thickness | mm | 1.4 | 1.0 | 1.0 |
|  | Minimum film thickness | μm | 28 | 60 | 50 |
|  | Uneven thickness ratio (maximum film thickness/ minimum film thickness) | none | 50 | 16.7 | 20 |
| Elastic modulus ratio (E2/E1) |  | none | 0.85 | 0.35 | 0.35-0.85 |
| Evaluation of peeling |  | none | A | A | A |
| Optical characteristic |  | none | A | B | A |

|  |  | Unit | comparative Example 1 | comparative Example 2 |
|---|---|---|---|---|
| First resin portion | Maximum film thickness | mm | 1.0 | 0.985 |
|  | Minimum film thickness | μm | 50 | 35 |
|  | Elastic modulus E1 | GPa | 3.5 | 3.5 |
| Second resin portion | Film thickness t | μm | — | 15 |
|  | Elastic modulus E2 | GPa | — | 3.15 |
| Sum of first resin portion and second resin portion | Maximum film thickness | mm | 1.0 | 1.0 |
|  | Minimum film thickness | μm | 50 | 50 |
|  | Uneven thickness ratio (maximum film thickness/ minimum film thickness) | none | 20 | 20 |

TABLE 2-continued

| | | | |
|---|---|---|---|
| Elastic modulus ratio (E2/E1) | none | — | 0.9 |
| Evaluation of peeling | none | C | C |
| Optical characteristic | none | A | A |

Example 2

The optical element of Example 2 was produced by a manufacturing method similar to that in Example 1 except that, in a process for forming the second resin portion 22, after the second mold 21 was released from the second resin portion 22, vacuum heating was performed under the conditions of the degree of vacuum of 10 Pa and a temperature of 75° C.

The manufacturing conditions of the optical element were summarized in Table 1.

Furthermore, with regard to the sum of the thickness of the first resin portion and the thickness of the second resin portion of the obtained optical element, the maximum thickness at the center was 1.0 mm, the minimum thickness at the end portion was 50 µm, and the uneven thickness ratio was 20. Moreover, the hardening response rate of the second resin portion was 60%.

In the optical element of Example 2, after a high-temperature endurance test, peeling was not found.

Moreover, the elastic modulus E1 of the first resin portion was 3.5 GPa, and the elastic modulus E2 of the second resin portion was 2.98 GPa, so that E2/E1 was 0.85. Moreover, the elastic modulus of the adhesion portion was 174 MPa.

Moreover, a camera including an optical system in which the optical element was incorporated was produced, and a plate having a striped pattern formed with three colors of red, green, and blue (RGB) was photographed for every color, so that, when chromatic aberration was evaluated, the evaluation result was "A".

The evaluation results of the optical element were summarized in Table 2.

Example 3

The optical element of Example 3 was produced by a manufacturing method similar to that in Example 1 except that the shapes of the first mold and the second mold were changed in such a manner that, with regard to the shape of the first resin portion, the maximum thickness at the center became 0.95 mm and the minimum thickness at the end portion became 0 µm and the thickness of the second resin portion became 50 µm.

The manufacturing conditions of the optical element were summarized in Table 1.

Furthermore, with regard to the sum of the thickness of the first resin portion and the thickness of the second resin portion of the obtained optical element, the maximum thickness at the center was 1.0 mm, the minimum thickness at the end portion was 50 µm, and the uneven thickness ratio was 20.

In the optical element of Example 3, after a high-temperature endurance test, peeling was not found.

Moreover, the elastic modulus E1 of the first resin portion was 3.5 GPa, and the elastic modulus E2 of the second resin portion was 1.23 GPa, so that E2/E1 was 0.35. Moreover, the elastic modulus of the adhesion portion was 174 MPa.

Moreover, a camera including an optical system in which the optical element was incorporated was produced, and a plate having a striped pattern formed with three colors of red, green, and blue (RGB) was photographed for every color, so that, when chromatic aberration was evaluated, the evaluation result was "A".

The evaluation results of the optical element were summarized in Table 2.

Example 4

The optical element of Example 4 was produced by a manufacturing method similar to that in Example 2 except that the shapes of the first mold and the second mold were changed in such a manner that, with regard to the shape of the first resin portion, the maximum thickness at the center became 0.685 mm and the minimum thickness at the end portion became 35 µm and the thickness of the second resin portion became 15 µm.

The manufacturing conditions of the optical element were summarized in Table 1.

Furthermore, with regard to the sum of the thickness of the first resin portion and the thickness of the second resin portion of the obtained optical element, the maximum thickness at the center was 0.7 mm, the minimum thickness at the end portion was 50 µm, and the uneven thickness ratio was 14.

In the optical element of Example 4, after a high-temperature endurance test, peeling was not found.

Moreover, the elastic modulus E1 of the first resin portion was 3.5 GPa, and the elastic modulus E2 of the second resin portion was 2.98 GPa, so that E2/E1 was 0.85. Moreover, the elastic modulus of the adhesion portion was 174 MPa.

Moreover, a camera including an optical system in which the optical element was incorporated was produced, and a plate having a striped pattern formed with three colors of red, green, and blue (RGB) was photographed for every color, so that, when chromatic aberration was evaluated, the evaluation result was "A".

The evaluation results of the optical element were summarized in Table 2.

Example 5

The optical element of Example 5 was produced by a manufacturing method similar to that in Example 2 except that the shapes of the first mold and the second mold were changed in such a manner that, with regard to the shape of the first resin portion, the maximum thickness at the center became 1.385 mm and the minimum thickness at the end portion became 13 µm and the thickness of the second resin portion became 15 µm.

In the optical element of Example 5, after a high-temperature endurance test, peeling was not found.

The manufacturing conditions of the optical element were summarized in Table 1.

Furthermore, with regard to the sum of the thickness of the first resin portion and the thickness of the second resin portion of the obtained optical element, the maximum thickness at the center was 1.4 mm, the minimum thickness at the end portion was 28 µm, and the uneven thickness ratio was 50.

Moreover, the elastic modulus E1 of the first resin portion was 3.5 GPa, and the elastic modulus E2 of the second resin portion was 2.98 GPa, so that E2/E1 was 0.85. Moreover, the elastic modulus of the adhesion portion was 174 MPa.

Moreover, a camera including an optical system in which the optical element was incorporated was produced, and a plate having a striped pattern formed with three colors of red, green, and blue (RGB) was photographed for every color, so that, when chromatic aberration was evaluated, the evaluation result was "A".

The evaluation results of the optical element were summarized in Table 2.

Example 6

The optical element of Example 6 was produced by a manufacturing method similar to that in Example 1 except that the shapes of the first mold and the second mold were changed in such a manner that, with regard to the shape of the first resin portion, the maximum thickness at the center became 0.94 mm and the minimum thickness at the end portion became 0 µm and the thickness of the second resin portion became 60 µm.

The manufacturing conditions of the optical element were summarized in Table 1.

Furthermore, with regard to the sum of the thickness of the first resin portion and the thickness of the second resin portion of the obtained optical element, the maximum thickness at the center was 1.0 mm, the minimum thickness at the end portion was 60 µm, and the uneven thickness ratio was 16.7.

In the optical element of Example 6, after a high-temperature endurance test, peeling was not found.

Moreover, the elastic modulus E1 of the first resin portion was 3.5 GPa, and the elastic modulus E2 of the second resin portion was 1.23 GPa, so that E2/E1 was 0.35. Moreover, the elastic modulus of the adhesion portion was 174 MPa.

Moreover, a camera including an optical system in which the optical element was incorporated was produced, and a plate having a striped pattern formed with three colors of red, green, and blue (RGB) was photographed for every color, so that, when chromatic aberration was evaluated, the evaluation result was "B".

The evaluation results of the optical element were summarized in Table 2.

Example 7

The method for manufacturing the optical element of Example 7 differs from those in other Examples in that forming the first resin portion and the second resin portion is performed in one process. Although a same method as described in Example 1 was performed until the first mold 11 was released from the first resin portion 12, ultraviolet light was radiated after the release while heating was performed at a temperature of 90° C. in the atmosphere of air (the concentration of oxygen being about 20%). This process described above can make the hardening reaction rate of the surface portion of the formed resin be lower than that of the portion at a side that is in contact with the first base material. This is because curing on the surface side of the formed resin was restrained by oxygen in the atmosphere. As a result, an elastic modulus of the surface portion of the formed resin becomes lower compared to the portion at the side that is in contact with the first base material. In other words, the formed resin has the second resin portion that has a low elastic modulus on the surface side and the first resin portion that has a high elastic modulus at the side that is in contact with the first base material. Moreover, the shape of the first resin portion in Example 7 had the maximum thickness of 0.966 mm at the center and the minimum thickness of 16 µm at the end portion. The thickness of the second resin portion became 34 µm. Moreover, the hardening response rate of the portion of the first resin portion that is in contact with the second resin portion was 60%.

The manufacturing conditions of the optical element were summarized in Table 1.

Furthermore, with regard to the sum of the thickness of the first resin portion and the thickness of the second resin portion of the obtained optical element, the maximum thickness at the center was 1.0 mm, the minimum thickness at the end portion was 50 µm, and the uneven thickness ratio was 20.

In the optical element of Example 7, after a high-temperature endurance test, peeling was not found.

Moreover, the elastic modulus E1 of the first resin portion was 3.5 GPa at the portion that is in contact with the first base material. When the thickness of the second resin portion was denoted by "t" and a portion thereof which was in contact with the adhesion portion was expressed by "t=0", the elastic modulus E2 of the second resin portion was as follows.

When $0 \leq t \leq 15$ µm, E2=1.23 GPa, and E2/E1=0.35.
When $15$ µm$<t \leq 34$ µm, $1.23$ GPa$<E2 \leq 2.98$ GPa, and $0.35<E2/E1 \leq 0.85$.

In this way, the elastic modulus of the second resin portion resulted in having an effect against peeling even in a case where the elastic modulus has a distribution thereof in the thickness direction. The result is illustrated in FIG. 7.

Moreover, a camera including an optical system in which the optical element was incorporated was produced, and a plate having a striped pattern formed with three colors of red, green, and blue (RGB) was photographed for every color, so that, when chromatic aberration was evaluated, the evaluation result was "A".

The evaluation results of the optical element were summarized in Table 2.

Comparative Example 1

The optical element of Comparative Example 1 was produced by a manufacturing method similar to that in Example 1 except that the formation of the second resin portion was not performed.

The manufacturing conditions of the optical element were summarized in Table 1.

Furthermore, with regard to the thickness of the adhesion portion of the obtained optical element, the maximum thickness at the center was 1.0 mm, the minimum thickness at the end portion was 50 µm, and the uneven thickness ratio was 20.

In the optical element of Comparative Example 1, after a high-temperature endurance test, at the end portion of the optical element, peeling was found between the first resin portion and the adhesion portion.

Moreover, the elastic modulus of the first resin portion was a uniform value of 3.5 GPa at both a portion thereof which was in contact with the first base material and a portion thereof which was in contact with the adhesion portion.

Moreover, prior to a high-temperature endurance test being performed, a camera including an optical system in which the optical element was incorporated was produced, and a plate having a striped pattern formed with three colors of red, green, and blue (RGB) was photographed for every color, so that, when chromatic aberration was evaluated, the evaluation result was "A".

The evaluation results of the optical element were summarized in Table 2.

Comparative Example 2

The optical element of Comparative Example 2 was produced by a manufacturing method similar to that in Example 1 except that, in forming the second resin portion 22, after the second mold 21 was released from the second resin portion 22, ultraviolet light was radiated while vacuum heating was performed. Furthermore, the amount of radiation of ultraviolet light during vacuum heating was 10 J. Moreover, the degree of vacuum during vacuum heating is 10 Pa, and the heating temperature was 82° C. Then, the hardening response rate of the second resin portion was 65%.

The manufacturing conditions of the optical element were summarized in Table 1.

Furthermore, with regard to the sum of the thickness of the first resin portion and the thickness of the second resin portion of the obtained optical element, the maximum thickness at the center was 1.0 mm, the minimum thickness at the end portion was 50 μm, and the uneven thickness ratio was 20.

In the optical element of Comparative Example 2, after a high-temperature endurance test, at the end portion of the optical element, peeling was found between the first resin portion and the adhesion portion.

Moreover, the elastic modulus E1 of the first resin portion was 3.5 GPa, and the elastic modulus E2 of the second resin portion was 3.15 GPa, so that E2/E1 was 0.90. Moreover, the elastic modulus of the adhesion portion was 174 MPa.

Moreover, prior to a high-temperature endurance test being performed, a camera including an optical system in which the optical element was incorporated was produced, and a plate having a striped pattern formed with three colors of red, green, and blue (RGB) was photographed for every color, so that, when chromatic aberration was evaluated, the evaluation result was "A".

The evaluation results of the optical element were summarized in Table 2.

The above results revealed that, in optical elements in which the ratio E2/E1 of the elastic modulus E2 of the second resin portion to the elastic modulus E1 of the first resin portion 1 was less than 0.9 and which satisfied the relationship of "E3<E2" with the elastic modulus E3 of the adhesion portion, peeling did not occur after a high-temperature endurance test. Moreover, these optical elements exhibited a good optical characteristic.

In an optical element according to an exemplary embodiment of the present disclosure, since the elastic modulus E2 of the second resin portion is lower than the elastic modulus E1 of the first resin portion, it is possible to decrease the difference between the elastic modulus E3 of the adhesion portion and the elastic modulus of the resin portion. Therefore, even if a deformation occurs in the optical element due to a change in environmental temperature, a stress which may occur between the resin portion and the adhesion portion can be more reduced than in the related art. Therefore, an optical element in which peeling is unlikely to occur between the resin portion and the adhesion portion can be provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-049735 filed Mar. 16, 2018, and No. 2019-011397, filed Jan. 25, 2019, which are hereby incorporated by reference herein in their entirety.

What is claimed is:

1. An optical element comprising:
    a first base material;
    a second base material;
    a first resin portion provided between the first base material and the second base material;
    a second resin portion provided in contact with the first resin portion; and
    an adhesion portion being contacted with the second resin portion and one of the first base material and the second base material,
    wherein, when an elastic modulus of the first resin portion is denoted by E1, an elastic modulus of the second resin portion is denoted by E2, and an elastic modulus of the adhesion portion is denoted by E3, the optical element satisfies a relationship of $E3<E2<0.9\times E1$.

2. The optical element according to claim 1, wherein the first resin portion and the second resin portion are formed from an identical resin.

3. The optical element according to claim 2, wherein the first resin portion and the second resin portion are formed by an acrylic resin.

4. The optical element according to claim 1, wherein E2/E1, which is the ratio of the elastic modulus E2 to the elastic modulus E1, is 0.35 or more and 0.85 or less.

5. The optical element according to claim 1, wherein a thickness of the second resin portion is 15 μm or more and 50 μm or less.

6. The optical element according to claim 1, wherein a difference between the elastic modulus E3 and the elastic modulus E2 is 2.9 GPa or less.

7. An optical apparatus comprising:
    a casing; and
    an optical system including a plurality of lenses located in the housing,
    wherein at least one of the plurality of lenses is the optical element according to claim 1.

8. An imaging apparatus comprising:
    a casing;
    an optical system including a plurality of lenses located in the housing; and
    an image sensor configured to receive light passing through the optical system,
    wherein at least one of the plurality of lenses is the optical element according to claim 1.

9. The imaging apparatus according to claim 8, wherein the imaging apparatus is a camera.

10. The optical element according to claim 1, wherein the first resin portion is provided on the first base material.

11. The optical element according to claim 10,
    wherein a surface of the first base material facing the first resin portion has a convex shape,
    wherein a surface of the second base material facing the first resin portion has a concave shape,
    wherein the first resin portion has an uneven thickness, and
    wherein, when, with regard to a sum of a thickness of the first resin portion and a thickness of the second resin portion, a minimum thickness thereof is denoted by tmin and a maximum thickness thereof is denoted by tmax, tmax/tmin is 14 or more and 50 or less.

12. The optical element according to claim 11, wherein the maximum thickness tmax is 0.7 mm or more and 1.4 mm or less.

13. The optical element according to claim 1, wherein the first base material and the second base material are made of glass or plastic.

14. A method for manufacturing an optical element including a first base material, a second base material, a first resin portion provided between the first base material and the second base material, a second resin portion in contact with the first resin portion, and an adhesion portion being contacted with the second resin portion and one of the first base material and the second base material, the method comprising:
   forming the first resin portion at the first base material;
   forming the second resin portion on the first resin portion; and
   providing an adhesive on at least one of the second resin portion and the second base material and forming an adhesion portion between the second resin portion and the second base material,
   wherein, when an elastic modulus of the first resin portion is denoted by E1, an elastic modulus of the second resin portion is denoted by E2, and an elastic modulus of the adhesion portion is denoted by E3, the optical element satisfying a relationship of $E3<E2<0.9\times E1$ is obtained.

15. The method according to claim 14,
   wherein the first resin portion and the second resin portion are formed by using a same photo-curable resin on both portions, irradiating the photo-curable resin with light, and curing the photo-curable resin.

16. The method according to claim 15, wherein the second resin portion has a lower curing reaction rate than the first resin portion.

17. The method according to claim 14, wherein the adhesion portion is formed by irradiating a photo-curable resin with light and curing the photo-curable resin.

* * * * *